United States Patent [19]
Budde et al.

[11] Patent Number: 5,711,063
[45] Date of Patent: Jan. 27, 1998

[54] METHOD OF FORMING A SUSPENSION FABRICATED FROM SILICON

[75] Inventors: Richard August Budde, Plymouth; Kevin Jon Schultz, Apple Valley; Daniel E. Glumac, Little Canada; Patrick J. Ryan, St. Paul; Cal E. Hardie, Edina, all of Minn.

[73] Assignee: Seagate Technology, Inc., Scotts Valley, Calif.

[21] Appl. No.: 661,816

[22] Filed: Jun. 11, 1996

[51] Int. Cl.$^6$ .................................................. G11B 5/42
[52] U.S. Cl. ........................ 29/603.06; 29/603.01; 360/104
[58] Field of Search ................... 29/603.01, 603.04, 29/603.05, 603.06; 360/103–106

[56] References Cited

U.S. PATENT DOCUMENTS

| | | | |
|---|---|---|---|
| 3,931,641 | 1/1976 | Watrous | 360/104 |
| 4,701,659 | 10/1987 | Fujii et al. | 310/334 |
| 4,740,657 | 4/1988 | Tsukagoshi et al. | 174/88 |
| 4,953,834 | 9/1990 | Ebert et al. | 267/160 |
| 5,006,946 | 4/1991 | Matsuzaki | 360/104 |
| 5,124,864 | 6/1992 | Matsuzaki | 360/104 |
| 5,304,460 | 4/1994 | Fulton et al. | 430/311 |
| 5,353,181 | 10/1994 | Frater et al. | 360/104 |

*Primary Examiner*—Carl E. Hall
*Attorney, Agent, or Firm*—Flehr Hohbach Test Albritton & Herbert LLP

[57] ABSTRACT

An apparatus comprising a magnetic head suspension assembly (10) comprised of a rectangular portion (12), load beam (14) and flexure (16) fabricated from a silicon structure using the etching techniques of the integrated circuit fabrication industry. Said magnetic head suspension assembly (10) having electrical leads (23) to a slider, a pre-amp circuit (25) and a microactuator (27) fabricated directly thereon. A system of providing a loading force passing to slider (50) comprising either a tapered base plate (40) adapted to be held by a horizontally oriented actuator arm or an actuator arm (60) having at least one angled receiving surface (62,64) for attachment to said suspension assembly. The method of forming a magnetic head suspension assembly (10) from an etched silicon structure comprising a cutting step comprising cutting said silicon structure into the silhouette shape of a magnetic head suspension assembly, having a rectangular portion (12), a load beam (14) and a flexure (16), said flexure being cut in a shape such that finger members (18), slider bond tongue (19) and dimple tongue (20) appear thereon, and subsequent to said cutting step, the step of photo-etching regions of said silicon structure to reduce thickness of said silicon structure in certain regions, said photo-etching leaving a remaining non-etched small plateau area which is adapted to act as a point or dimple for an attached slider to gimbal about.

6 Claims, 3 Drawing Sheets

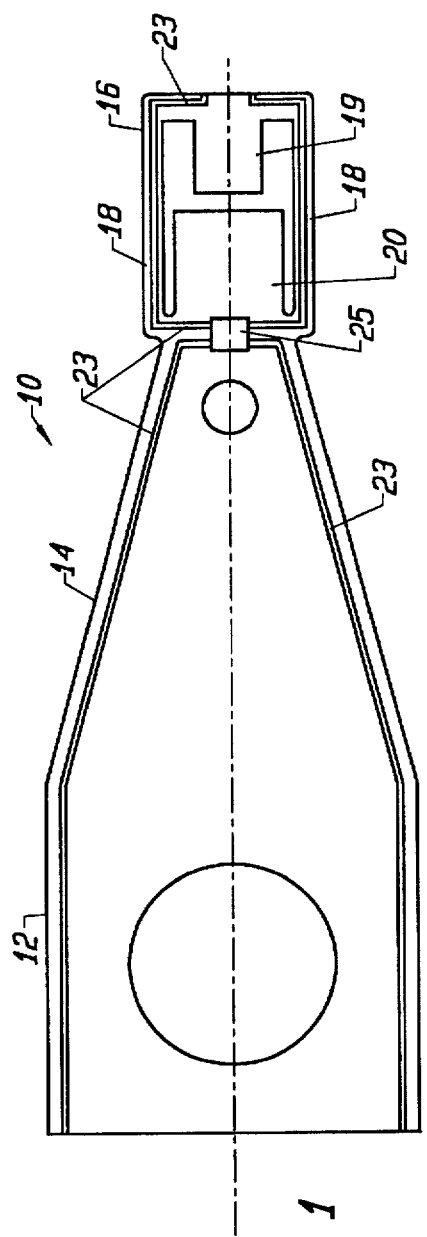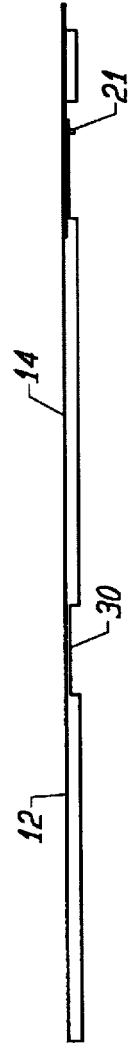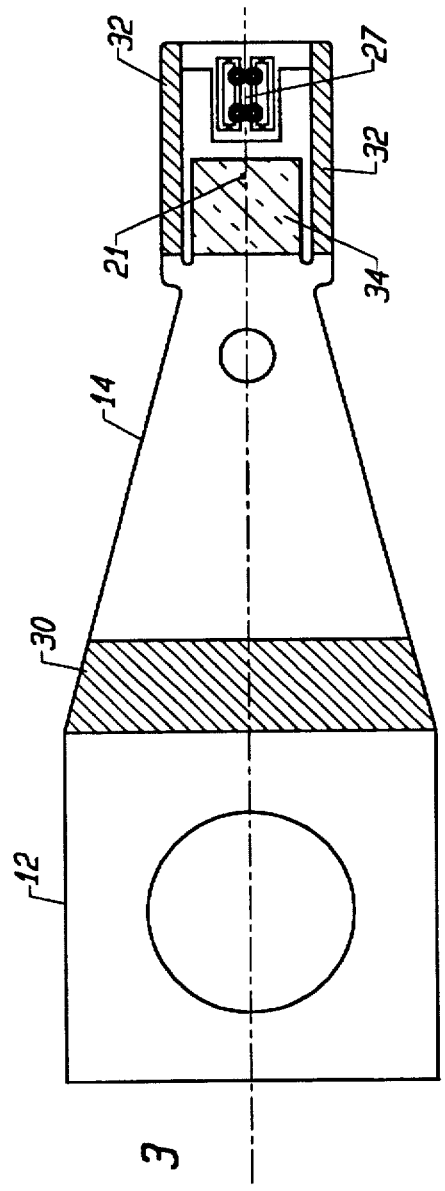
FIG. 1
FIG. 2
FIG. 3

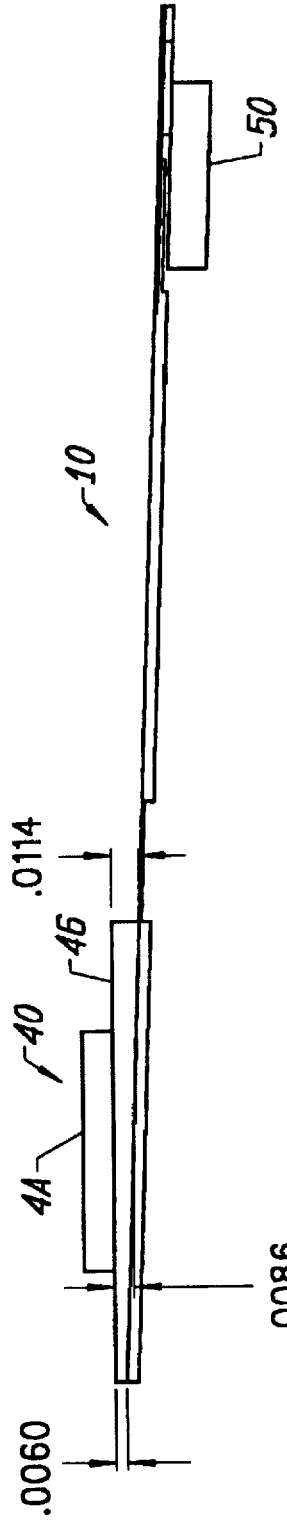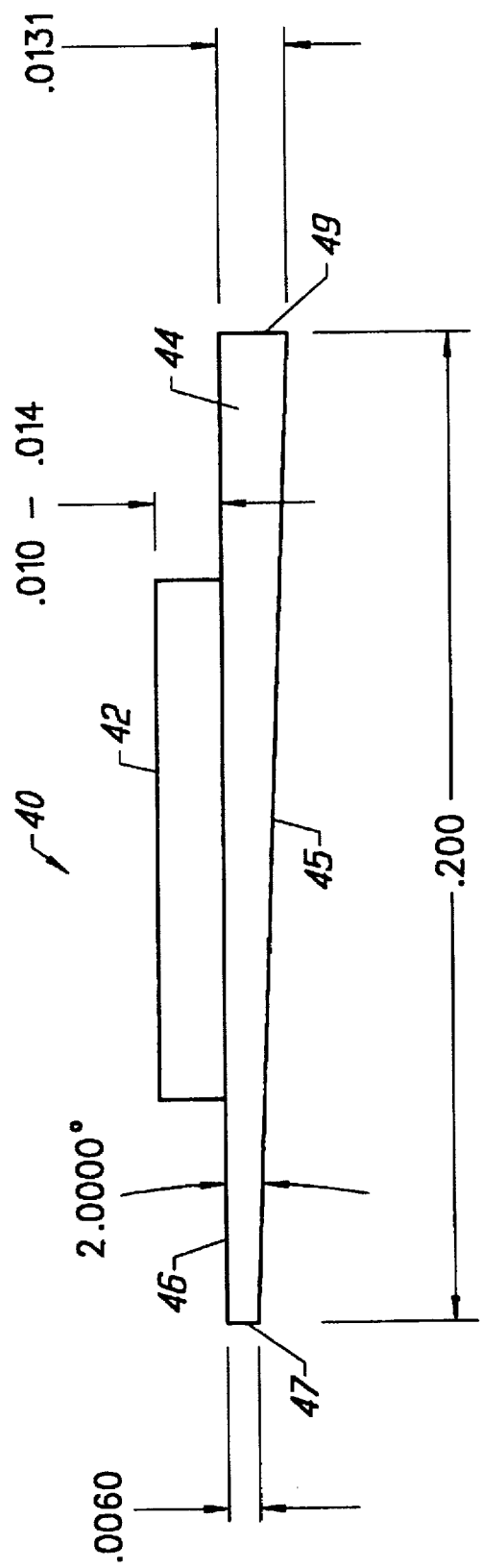

METHOD OF FORMING A SUSPENSION FABRICATED FROM SILICON

FIELD OF THE INVENTION

The present invention relates to suspension assemblies and more particularly to magnetic head supporting suspension assemblies for data storage systems.

BACKGROUND OF THE INVENTION

1. Magnetic Head Suspension Assemblies

Computer disc drives store information on rotating magnetically recordable discs. This information is stored in concentric tracks on the rotating disc. A magnetic head or transducer element is moved from track-to-track on these discs to read and record the desired information. Typically, these rotating discs are closely held apart in a parallel stacked relationship. Sometimes, however, only one rotating disc is found in the disc drive. In either case, available vertical space is very limited in the construction of the disc drive. Accordingly, these magnetic heads or transducer elements must be designed to be held in close contact with a rotating disc or between two very closely spaced apart parallel rotating discs. Magnetic head suspension assemblies provide an arm-like structure which is inserted either above a single rotating disc or between two separately spaced apart rotating discs, moving the magnetic head back and forth. These suspension assemblies support the magnetic head which is held near the surface of the disc as the disc rotates. This magnetic head is carried in a carrier or slider which is pushed gently against the surface of the disc when the disc is not rotating by the suspension assembly. When the disc begins to rotate at high speed, the slider is aerodynamically shaped to fly slightly above or very slightly away from the surface of this rotating disc. When the slider flies slightly away from the rotating disc, the magnetic head contained in the slider is then moved back and forth from track to track by the action of the support assembly holding the slider. In certain disc drive designs, the carrier of this magnetic head rides on a liquid film on the rotating disc. In either the air or liquid case, the magnetic head suspension assembly connects the slider to a rotary or linear actuator which operates to move the suspension assembly thereby positioning the magnetic head or transducer element directly above the desired track location on the disc. Acting as an arm, the suspension assembly also provides a point support for the slider which allows the slider to gimbal in order to adjust its orientation as appropriate to the surface of the disc. Typically, in many disc drives, a plurality of magnetic head suspension assemblies are used, each holding a magnetic head, with each magnetic head being kept in close proximity to a rotating disc, thereby requiring a plurality of parallel suspension assemblies, with each suspension assembly extending between two very closely spaced apart parallel rotating discs.

Magnetic head suspension assemblies typically are composed of an elongated load beam adapted to be connected to an actuator arm at one end. At the other end, an arrangement of flexible members, or flexure is provided. To this flexure is attached the slider which carries the magnetic head. This flexure is designed to allow limited up-and-down spring-type movement in the slider which is holding the magnetic head or transducer. A point for this slider to be mounted to and gimbal about is provided at this flexure.

As disc drives have become smaller in size with increased data storage capacity, data recording density of the disc has gone up dramatically and the data tracks have become smaller and closer together. The magnetic heads and sliders have also decreased in size. These lighter weight magnetic heads and accompanying sliders require a flexible suspension to support them as the older suspensions tended to be too stiff to allow the new smaller sliders to adjust their position. In addition, while the suspension assembly must be flexible in the vertical direction as well as allow for some pitch and roll of the slider, the suspension also must be rigid in the horizontal or lateral direction in order to prevent unwanted side-to-side yaw movement in the slider. Traditionally, this problem was solved by using thinner and thinner suspension assemblies with a proportionally larger ratio of width-to-thickness. However, the lower limits of the thickness to which materials can be milled are being approached. Steel can be milled accurately to a thickness of 0.025 millimeters. In attempting to mill steel to such a small thickness, the irregularities in the grain structure of the steel can cause great variations in the thickness and make material unsuitable for use in suspension assemblies. As such, the desire exists for a new method or material which can be used to produce thinner suspension assemblies, overcoming the problems inherent in steel suspension assembly fabrication at this exceptional thinness.

Another issue encountered in the present design of magnetic head suspension assemblies is that the trend in the industry has been to design concentric tracks closer and closer together. As these tracks become closer and closer together, it becomes more difficult for current suspension assemblies to find and follow a particular track. A novel suspension assembly design would be to place a microactuator on the suspension near the slider as a way of providing small, fine tuned track following capabilities while a main rotary actuator provides the large actuation motions. These micro-actuators can be magnetically driven or electrostatically driven.

In the construction of magnetic head suspension assemblies, it is also necessary to provide a downward vertical loading force acting from the load beam through the flexure and onto the slider which holds the magnetic head against the rotating disc. This downward vertical force is counterbalanced by the lifting force when the slider flies above the rotating disc drive. (It is to be understood that if a slider is instead positioned below a rotating disc, the vertical force will instead be directed upwards). The balancing of the loading and lifting forces is stabilized when the slider positions the magnetic head very close, but not touching, the rotating disc. In order to have the magnetic head closely follow the disc surface at constant spacing, it is desirable to enable the slider to roll around a first axis substantially parallel to the load beam of the suspension assembly and to pitch about a second axis orthogonal to the first axis. It is also desirable to eliminate yaw about an axis substantially parallel to said first axis.

As it is necessary to have the magnetic head in electrical communication with various control circuitry located elsewhere in the disc drive, all prior art designs have used some form of wire which is attached to the magnetic head and strung along the load beam of the suspension assembly. This wire may be glued to the load beam. Minimizing the amount of wiring along the load beam, especially at the connection point to the slider holding the magnetic head would be desired as a further space saving measure. Present systems which use pre-amp circuits require that these components be placed some distance away from the magnetic head as they are too heavy and bulky to be carried on the suspension assembly, where available space is extremely limited. A system for placing these components closer to the magnetic head, and decreasing their bulk and weight in the system would be highly desirable. In addition, the possibility of integrating electrical leads, pre-amp circuitry, and a microactuator device into a suspension assembly would offer the advantages of a reduced number of components, simplified assembly, and higher performance.

Consequently, the need exists for an exceptionally thin magnetic head suspension assembly which is enabled to reach between two parallel closely spaced stacked rotating discs or above a single rotating disc, where minimal space is available. In spite of its exceptional thinness, however, this magnetic head suspension assembly must be sufficiently rigid to resist any unwanted bending yaw motion, and also provide a stiff enough load beam which provides and carries a downward (or upward) vertical load through to the slider holding the magnetic head, thus tending to hold the slider in position against the disc. In addition, the preferred suspension assembly must have a high resonance frequency to avoid unwanted vibrations and must also maintain pitch and roll gimbal stiffness for its slider which is comparable to present designs. In addition, the need exists to minimize the size and weight of electrical components and wiring connections along the load beam. The desired end result of this design would be fabricating miniaturized electrical leads connecting directly with the slider, with a miniaturized pre-amp circuit and a microactuator also being directly fabricated onto the load beam thereby providing a compact integrated device.

Accordingly, a novel approach to solving the above limitations would be to fabricate the entire suspension assembly from a silicon structure, for example a silicon crystal wafer. This would enable manufacture of a very thin suspension assembly which could be etched away to a very small thickness using processing methods similar to those presently used in the integrated circuit fabrication industry. An etched silicon suspension assembly would be sufficiently rigid and the various electrical components, such as leads running directly to the magnetic head, a pre-amp circuit and a microactuator could be etched directly on the silicon load beam, thus providing an extremely thin and compact system.

2. Specific Prior Art Systems

U.S. Pat. No. 3,931,641 to Watrous discloses a transducer suspension mount apparatus. This device provided a head arm assembly which is responsive to changes in the topography of the surface of a spinning disc, thereby maintaining a substantially uniform close distance and attitude between the magnetic head transducing gap and the rotating disc surface. This head suspension assembly is designed to respond with pitch and roll movements in its transducer carrier while resisting against any radial, circumferential and yaw motions. This device suffers from various limitations. First, it does not possess the required extreme thinness as needed in today's magnetic head suspension assemblies. This is due in particular to the fact that Watrous' load beam has a plurality of flanges giving rigidity to its structure, but also thickening it. Secondly, as the Watrous design is not fabricated from silicon, there is no capacity to fabricate electrical leads to the slider, a pre-amp circuit, or a microactuator directly into the load beam.

U.S. Pat. No. 4,953,834 to Ebert et al. discloses a bending spring joint formed of a selectively etched silicon wafer material. This joint is designed for use in flexible suspensions for pendulums, having a generally T-shaped pendulum and a pendulum fastening device. The Ebert system is not structured or adapted to be used as a magnetic head suspension assembly.

U.S. Pat. No. 5,006,946 to Matsuzaki discloses a flexible polymeric resonance magnetic head supporting device. This device provides a magnetic head supporting device with a reduced size and simple wiring structure. This device suffers from various limitations. First, the load beam of this head supporting device is not very thin. The thickness of this load beam is partially due to the fact that the supporting arm comprises a resilient spring portion and a rigid beam portion contiguous to said resilient spring portion, thus giving added thickness to the support arm suspension assembly. This rigid beam portion is also provided on both sides with flanges which also contribute to the thickness of the support suspension assembly. As this suspension assembly is not made of silicon, it is not possible to have electrical leads, a pre-amp circuit, or a microactuator integrated directly into the load beam of the suspension assembly.

U.S. Pat. No. 5,124,864 to Matsuzaki discloses a magnetic head supporting device including a flexible member of polymeric resonance material. This device assures an appropriate balance between the dynamic pressure for lifting the magnetic head from the rotating disc and the spring pressure exerted by the supporting device, thus achieving a stable floating posture for an accompanying slider. The Matsuzaki device suffers from various limitations. As this device is not fabricated from silicon, the Matsuzaki magnetic head supporting device will not be extremely thin and will not be adapted such that electrical leads to the slider, a pre-amp circuit, or a microactuator could be directly fabricated on the magnetic head supporting arm or suspension assembly.

U.S. Pat. No. 5,353,181 to Frater, et al. discloses an etched suspension system. This head suspension assembly comprises a load beam, a flexure, and a transducer assembly. This suspension system suffers from various limitations. First, it is rather thick. This is caused in part by the fact that the load beam has flanged sides and that the flexure is mounted adjacent to the load beam along a significant portion of this load beam. Secondly, as this suspension system is not adapted to be manufactured from silicon, the advantages of exceptional thinness and the potential for fabricating electrical leads, a pre-amp circuit, and a microactuator directly on the load beam of the suspension assembly, cannot be met.

SUMMARY OF THE INVENTION

It is an object of the present invention to provide a magnetic head suspension assembly fabricated from a silicon structure, for example a silicon crystal wafer.

It is a further object of the present invention to provide a magnetic head suspension assembly fabricated from silicon, using processing methods similar to those used in the integrated circuit fabrication industry.

It is a further object of the present invention to provide a very thin magnetic head suspension assembly. In particular, it is an object of the present invention to utilize a silicon structure having an initial thickness of approximately 0.0045 inches. This thickness may potentially be decreased to a size of as little as 0.001 inches at some locations. These above maximum and minimum thickness dimensions are understood to be illustrative of the potential exceptionally thin final dimensions of the suspension assembly system. These dimensions may be varied in the apparatus and method of the invention as disclosed herein, and are therefore not meant to be limiting as to the potential dimensions of this system.

It is a further object of the present invention to provide a magnetic head suspension assembly fabricated from silicon wherein portions of the silicon etched away, thereby reducing the thickness of the resulting suspension assembly.

It is a further object of the present invention to provide a magnetic head suspension assembly fabricated from etched away silicon having a small, full-thickness plateau surrounded by a partially etched away area wherein this plateau may function in the same way as the dimple in conventional suspension assembly designs, being a discrete load point for a slider containing a magnetic head to gimbal about, while maintaining pitch and roll gimbal stiffness comparable to current stainless steel suspension assemblies.

It is a further object of the present invention to provide a magnetic head suspension assembly fabricated from silicon having an extremely high resonance frequency, and a more favorable density to stiffness ratio than stainless steel which offers resonance and shock performance advantages.

It is a further object of the present invention to provide a magnetic head suspension assembly fabricated from silicon, wherein electrical leads to the slider, a pre-amp circuit, and a microactuator are directly etched onto the suspension assembly utilizing processing methods similar to those used in the integrated circuit fabrication industry, thereby offering the advantages of a reduced number of components, simplified assembly, and higher performance.

It is a further object of the present invention to provide a magnetic head suspension assembly fabricated from silicon wherein a vertical load is imparted to a slider by means of tapering the thickness of a base plate connecting the suspension assembly to the actuator arm, thereby producing a slight angle of deflection in the suspension assembly, tending to force the slider into contact with the rotating disc. During initial positioning, the suspension assembly will typically be slightly bent away from the surface of the rotating disc, thereby causing a vertical load to be maintained on the slider by the action of the bent or deflected suspension assembly.

It is a further object of the present invention to provide a magnetic head suspension assembly fabricated from silicon wherein a vertical load is imparted to a slider by means of a tapered thickness on the actuator arm to which the suspension assembly is mounted. This tapered thickness is designed to produce a slight angle of deflection in the suspension assembly, tending to force the slider into contact with the rotating disc. During initial positioning, the suspension assembly will typically be slightly bent away from the surface of the rotating disc, thereby causing a vertical load to be maintained on the slider by the action of the bent or deflected suspension assembly.

It is a further object of the present invention to provide a magnetic head suspension assembly wherein the length of the load beam is much shorter than in current sinless steel designs, thereby offering advantages of higher resonance frequencies, and a higher part density on the silicon structure during fabrication thereby offering cost and volume advantages. This shorter length of the load beam is not a limiting feature of the present invention, but rather is an additional novel feature which can be added to an already novel invention.

Additional objects and advantages of the present invention will become apparent from and are set forth in detail in the description of the Best Mode of Carrying Out the Invention and the accompanying drawings attached.

DISCLOSURE OF THE INVENTION

The present apparatus discloses a monolithic magnetic head suspension assembly fabricated from an etched silicon structure. The suspension assembly may have one or more electrical leads, a pre-amp circuit and a microactuator etched directly thereon. The suspension assembly further comprises in preferred forms either a base plate having a tapered thickness and attached thereto or an actuator arm having at least one angled receiving surface for attachment to said suspension assembly, attached thereto. The suspension assembly may also be provided with a non-etched away plateau, said plateau functioning as a point for a slider to gimbal about.

Also disclosed is the method of forming a magnetic head suspension assembly from an etched silicon structure comprising: (a) a cutting step comprising cutting said silicon structure into the silhouette shape of a magnetic head suspension assembly, having a rectangular portion, a load beam and a flexure, said flexure being cut in a shape such that finger members, slider bond tongue and dimple tongue appear thereon, and (b) subsequent to said cutting step, the step of photo-etching regions of said silicon structure to reduce thickness of said silicon structure in certain regions, said photo-etching leaving a remaining non-etched small plateau area which is adapted to act as a point or dimple for an attached slider to gimbal about.

BRIEF DESCRIPTION OF THE DRAWINGS

FIG. 1 is a top plan view of a magnetic head suspension assembly as disclosed in accordance with the present invention.

FIG. 2 is a side elevation view of a magnetic head suspension assembly as disclosed in accordance with the present invention.

FIG. 3 is a bottom plan view of a magnetic head suspension assembly as disclosed in accordance with the present invention.

FIG. 4 is a side elevation view of a magnetic head suspension assembly having a tapered thickness on its base plate as disclosed in accordance with the present invention.

FIG. 5 is a side elevation view of a base plate shown in FIG. 4, having a tapered thickness as disclosed in accordance with the present invention.

DETAILED DESCRIPTION OF A PREFERRED EMBODIMENT

Figure 6:
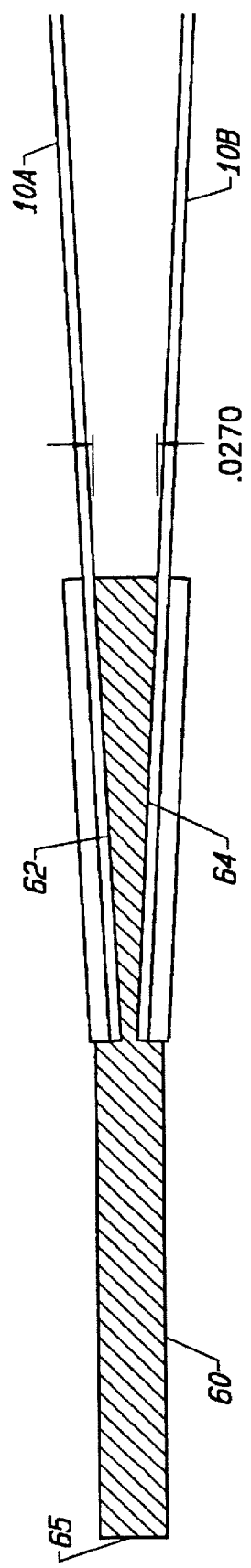
FIG. 6 is a side cross-sectional view of an actuator arm having a tapered thickness, mounted to and supporting two magnetic head suspension assemblies fabricated from silicon as disclosed in accordance with the present invention.

Magnetic head suspension assemblies are designed to support a magnetic head which reads and records information stored on a computer disc drive. In a typical disc drive, a plurality of rotating discs are stacked in parallel and separated from one another by a small distance. The data stored on these discs is found in various concentric tracks. The magnetic head reads and records information and operates when positioned proximate the surface of the rotating disc. The magnetic head is supported in a slider which flies just above the surface of a rotating disc, the slider balanced in position, being forced towards the disc by a vertical loading force in the suspension assembly and simultaneously being lifted away from the rotating disc due to its aerodynamic design. Accordingly, when flying proximate the rotating disc, this magnetic head must be supported and moved to various positions covering different concentric tracks in the rotating disc.

As these rotating discs are stacked in close proximity to one another, a device for holding and moving the slider containing the magnetic head between these rotating discs is required. A magnetic head suspension assembly performs this function. In designing magnetic head suspension assemblies, it is important that they are very thin so as to fit between any two closely separated rotating discs or very near the surface of one rotating disc. It is also important that these magnetic head suspension assemblies are rigid enough to resist any unwanted bending yaw motion. A typical suspension assembly is comprised of a load beam which is attached to an actuator arm at one end and an arrangement of flexible members or flexure at the other end. Magnetic head suspension assemblies must hold the slider containing the magnetic head such that the magnetic head remains in very close proximate contact with the rotating disc yet still allow the slider to gimbal in position about a point on the flexure such that the magnetic head is able to shift in position to adjust to the surface of the disc.

As is best seen in FIG. 1, suspension assembly 10 is a solid monolithic thick structure composed principally of three regions. A rectangular portion 12, a load beam 14 and a flexure 16 are shown. Flexure 16 further comprises two finger members 18, slider bond tongue 19 and dimple tongue 20. Finger members 18 provide the gimbaling structure to allow the magnetic recording head to follow the disc contours. Slider bond tongue 19 is used to adhesively secure the magnetic head to the flexure. Dimple tongue 20 is adapted to hold and support the slider by way of plateau 21 which is best seen in FIGS. 2 and 3. FIG. 2 best reveals the exceptional thinness of the magnetic head supporting assembly when seen from the side. The present magnetic head suspension assembly is fabricated from a silicon structure using the methods of photo-etching typically found in the integrated circuit industry.

The thickness dimension of the silicon structure used can be extremely small, yet still provide a rigid suspension assembly system. As an example, it is easily possible to utilize a silicon structure having an initial thickness of as little as approximately 0.0045 inches. From this initial thickness, the thickness at a variety of locations on this silicon structure can be photo-etched away to a size of as little as 0.001 inches. These above maximum and minimum thickness dimensions are understood to be illustrative of the potential exceptionally thin final dimensions of the suspension assembly. Accordingly, as these dimensions may be varied in the apparatus and method of the invention as disclosed herein, they are therefore meant to provide an illustrative example and are therefore not to be interpreted as limiting the particular dimensions of the final system.

Continuing with the above example, the approximate thickness of this suspension assembly is preferably on the order of 0.0045 inches at its thickest location, this thickness being the initial thickness of the silicon before any surface material is etched away. This silicon is then photo-etched away at a number of locations using the same processing methods that are used in the integrated circuit fabrication industry. As is best seen in FIG. 3, region 30 on load beam 14 and region 32 on each of finger members 18 has been etched away such that their remaining thickness is approximately 0.001 inch. Material is removed from region 30 to reduce the vertical stiffness of the suspension assembly. If the vertical stiffness becomes too high, the vertical force applied through to the magnetic head by the suspension assembly will be overly sensitive to changes in the relative vertical or angular positioning of the actuator arm with respect to the disc surface. On the other hand, if the vertical stiffness is too low, he suspension assembly may not be able to generate a large enough vertical force on the magnetic head. Furthermore, a low vertical stiffness would negatively effect the resonance performance of the suspension assembly. Region 32 has been etched away to reduce the gimbaling stiffness of flexure 16 to better enable the magnetic head to follow the contours of the disc surface. Region 34 comprising dimple tongue 20 has been etched away to a thickness of approximately 0.0025 inches. This region 34 has been etched away to provide a clearance for an attached slider to gimbal around plateau 21. Region 34 is of a different thickness than regions 30 and 32 because the vertical stiffness of region 34 should be kept as high as possible to minimize the vertical deflection under a vertical load while still providing adequate clearance for the slider to gimbal properly. The remaining surface regions of the suspension assembly retain its initial thickness of 0.0045 inches as these surfaces have not been etched. Plateau 21 also has a thickness on the order of 0.0045 inches as this plateau has not been etched and therefore it remains at the same thickness as the other unetched regions. Viewing FIGS. 2 and 3 together, the respective thicknesses of the various regions of the suspension assembly are clearly depicted.

The resulting suspension assembly being fabricated from silicon has an extremely high resonance frequency thereby avoiding and reducing any unwanted vibrations. In addition, the present suspension assembly maintains the pitch and roll gimbal stiffness comparable to current stainless steel designs. Also, the use of silicon has the added advantage of having a more favorable density to stiffness ratio to stainless steel which offers resonance and shock performance advantages. The critical resonance frequencies of the present design are approximately twice as high as comparable prior art stainless steel designs. In the present invention, these high resonance frequencies encountered are typically on the order of 5900 Hertz for a first bending frequency, 7900 Hertz for a first torsion frequency, 24,000 Hertz for a yaw frequency and 37,000 Hertz for a second torsion frequency.

As is best seen in FIG. 1, due to the fact that the present suspension assembly is fabricated directly from silicon, it is possible to fabricate electrical leads 23 which pass to the slider, and/or a pre-amp circuit 25, in the region of dimple tongue 20. As is best seen in FIG. 3, a microactuator 27 could be fabricated directly onto slider bond tongue 19. This micro-actuator operates to provide a small, fine tuned track following capability which is especially important as the trend in disc drive designs is to have the tracks positioned closer and closer together. Microactuator 27 could be either magnetically driven or electro-statically driven.

The advantages to incorporating these features directly into the design of the suspension assembly are many. Specifically, being integral to the load beam of the suspension assembly, these added electrical components add no extra weight or bulk to the suspension assembly, and they do not occupy considerable additional space in the suspension system, as would instead be the case with these relatively large electrical components being added directly to a solid steel suspension assembly. Being photo-etched into the suspension assembly, the addition of these electrical components would in fact reduce the size and weight of the suspension assembly due to the removal of silicon material during the etching process. In addition, the integration of these electrical leads 23, pre-amp circuitry 25, and a microactuator 27 directly onto suspension assembly 10 offers the advantages of a reduced number of components, a simplified assembly and higher system performance.

It is also very important that magnetic head suspension assemblies provide a vertical load to the slider, thus pushing the magnetic head into proximate contact with the surface of the rotating disc. This vertical load must be precisely balanced with the upward aerodynamic lifting force on the slider causing the magnetic head to reside in a location very near the surface of the rotating disc. The present invention must therefore provide some form of vertical load on the slider. In prior art stainless steel suspension assemblies, the assembly was plastically deformed or bent slightly to force the slider against the disc surface. Unfortunately, the present invention is fabricated of silicon which is a brittle material and cannot be plastically deformed like stainless steel. Therefore, the methods of obtaining a vertical load, (typically on the order of 1 gram), with current stainless steel suspension assemblies cannot be used with the silicon or other brittle materials. Two alternative systems for creating this gram load for use with the silicon suspension are separately explained below. Conceivably, however, these two systems could even be used in combination.

In the first system, as is best shown in FIG. 4, and further in FIG. 5, a suspension assembly 10 is mounted against a base plate 40. This base plate is adapted to be held and rotated by a horizontally oriented actuator arm. This base plate 40 is composed of a circular mount 42 and a base 44. Circular mount 42 is adapted to be held and rotated by the actuator arm. Assembly mount 44 is adapted to attach and substantially cover the rectangular portion 12 of suspension assembly 10. Assembly mount 44 has a bottom surface 45 which is tapered giving assembly mount 44 an approximate thickness of 0.0060 inches at end 47 and an approximate thickness of 0.0131 inches at end 49. Accordingly, bottom surface 45 is oriented at a slight angle of approximately 2° to top surface 46.

As can be seen clearly in FIG. 4, the mounting of suspension assembly 10 to base plate 40 will produce a slight downward angular deflection of approximately 2° in suspension assembly 10 with respect to circular mount 42 and top surface 46. Accordingly, when circular mount 42 is held by a horizontally oriented actuator arm, suspension assembly 10 will tend to be angled slightly downwards. Slider 50 will therefore tend to push down onto the surface of a rotating disc drive positioned therebelow. (It is to be understood that the orientation of the system could be reversed with the slider instead pushing up towards the surface of a rotating disc positioned thereabove, without departing from the suspension assembly as described herein).

The second system of achieving the slight angling of suspension assembly 10 to an actuator arm is shown in FIG. 6 which depicts a cross-section of an actuator arm and two suspension assemblies 10. Actuator arm 60 is shown with a top angled receiving surface 62 and a bottom angled receiving surface 64. When a suspension assembly 10a is mounted on top angled receiving surface 62, it will tend to be angled slightly upwards from an axis 65 which passes horizontally through actuator arm 60. Similarly, when a suspension assembly 10b is mounted on bottom angled receiving surface 64, this suspension assembly 10b will tend to be angled slightly downwards from axis 65. In this embodiment, suspension assemblies 10a and 10b are designed to fit between two parallel separately spaced closely separated rotating discs. Accordingly, due to the length of suspension assemblies 10a and 10b, these suspension assemblies initially must be slightly pinched together at their free ends in order for them to fit between the two closely-spaced parallel rotating discs. This slight deflection at the free ends of suspension assemblies 10a and 10b will be resisted by the material's tendency to straighten, thereby pushing their accompanying sliders towards the surface of the two rotating discs positioned both above and below the suspension assemblies.

A final novel feature of the present invention is the fact that the length of load beam 14 is much shorter than in current stainless steel designs. (Typically, on the order of 0.433" as contracted with 0.710" for some prior art designs). A shorter load 14 beam offers several advantages, namely, higher resonance frequencies, and a higher part density on the silicon structure during fabrication which offers cost and volume advantages. This shorter load beam 14, with its high resonance frequency is more robust to shock and is therefore much less likely to be damaged if the disc drive containing said suspension assembly were to be dropped onto a hard surface. This example of a particular short length of suspension assembly 10 is meant to be illustrative and may be varied in the apparatus and method of the invention as disclosed herein. Consequently, this length dimension is not meant to be limiting as to the potential length dimensions of the suspension assembly system as disclosed herein. Rather, the additional fact that this length dimension can be made much shorter when fabricated from silicon, rather than stainless steel as is used in existing suspension assemblies, is a further novel feature of an already novel design.

Having set out the apparatus of the present invention, the preferred method can now be set forth.

The first step in the present invention is cutting a monolithic silicon structure into the silhouette shape of a magnetic head suspension assembly 10. This suspension assembly is to be cut such that its shape has a rectangular portion 12, a load beam 14 and a flexure 16. Flexure 16 is cut in the shape such that finger members 18, slider bond tongue 19 and dimple tongue 20 appear thereon.

Subsequent to this initial cutting step, a photo-etching step is performed where regions 30 and 32 are etched away in thickness. Region 34 is also etched away in thickness, but not to the extent that regions 30 or 32 are etched away. As an example, the initial thickness of a silicon structure such as a silicon crystal wafer can be on the order of 0.0045 inches with regions 30 and 32 etched to 0.001 inches and region 34 etched to 0.0025 inches. A plateau 21 represents a small area of region 34 which is not etched away. This plateau 21 acts as a point or dimple for an attached slider to gimbal about.

Concurrent to this etching step, further etching can be made on suspension assembly 10 to fabricate an electrical lead 23 which passes directly to an attached slider, and/or a pre-amp circuit 25, and further etching can be made on slider bond tongue 19 to fabricate a microactuator 27.

Subsequent to the etching step, in one embodiment, a tapered base plate 40 adapted to be held and rotated by a horizontally oriented actuator arm is mounted to the suspension assembly 10. In a second embodiment, suspension assembly 10 is mounted onto an angled receiving surface 62 or 64 of an actuator arm 60.

What is claimed is:

1. The method of forming a magnetic head suspension assembly from an etched silicon structure comprising:

a) a cutting step comprising cutting said silicon structure into a shape of a magnetic head suspension assembly, having a rectangular portion, a load beam and a flexure, said flexure being cut in a shape such that two finger members, one slider bond tongue and one dimple tongue appear thereon, and b) subsequent to said cutting step, a step of photo-etching regions of said magnetic head suspension assembly to reduce thickness of said silicon structure in certain regions, said photo-etching leaving a remaining non-etched small plateau area which is adapted to act as a point or dimple for a slider.

2. The method of forming a magnetic head suspension assembly from an etched silicon structure as set out in claim 1 further comprising:

a) concurrent to said photo-etching step, further etching on said suspension assembly at least one electrical lead.

3. The method of forming a magnetic head suspension assembly from an etched silicon structure as set out in claim 1 further comprising:

a) concurrent to said photo-etching step, further etching a pre-amp circuit on said suspension assembly.

4. The method of forming a magnetic head suspension assembly from an etched silicon structure as set out in claim 1 further comprising:

a) concurrent to said photo-etching step, further etching a microactuator on said slider bond tongue.

5. The method of forming a magnetic head suspension assembly from an etched silicon structure as set out in claim 1 further comprising:

a) subsequent to the photo-etching step, mounting a tapered base plate to said suspension assembly, said base plate adapted to be held and rotated by a horizontally oriented actuator arm.

6. The method of forming a magnetic head suspension assembly from an etched silicon structure as set out in claim 1 further comprising:

a) subsequent to the photo-etching step, mounting said suspension assembly onto an angled receiving surface of an actuator arm.

* * * * *